United States Patent
Bates et al.

(10) Patent No.: US 6,817,935 B2
(45) Date of Patent: Nov. 16, 2004

(54) METHOD OF MAKING A SURFACE TREATING ARTICLE AND SUCH A SURFACE TREATING ARTICLE

(75) Inventors: Michael S. Bates, North Oaks, MN (US); Stanley L. Conwell, East Bethel, MN (US); Douglas E. Devaney, Austin, TX (US); Darla A. Elgin, Ames, IA (US); Peter J. Fritz, Minneapolis, MN (US); Richard L. Fry, White Bear Lake, MN (US); Bruce W. Livermore, Stillwater, MN (US); James W. Malaske, St. Paul, MN (US); Bradley S. McKay, New Ulm, MN (US); Paul J. Richtman, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/462,479

(22) Filed: Jun. 17, 2003

(65) Prior Publication Data

US 2003/0207652 A1 Nov. 6, 2003

Related U.S. Application Data

(62) Division of application No. 09/607,210, filed on Jun. 30, 2000, now Pat. No. 6,609,951.

(51) Int. Cl.⁷ .......................... B24D 11/00; B24D 17/00
(52) U.S. Cl. ...................... 451/539; 451/532; 451/508
(58) Field of Search .................... 451/539, 526–533, 451/550, 6, 8–11, 508–512

(56) References Cited

U.S. PATENT DOCUMENTS

| | | | |
|---|---|---|---|
| 3,307,300 A | 3/1967 | Field | |
| 3,561,938 A | 2/1971 | Block et al. | |
| 3,562,968 A | 2/1971 | Johnson et al. | |
| 3,667,170 A | 6/1972 | MacKay, Jr. | |
| 3,688,453 A | 9/1972 | Legacy et al. | |
| 3,738,569 A | 6/1973 | Killaly, Sr. | |
| 3,747,286 A | 7/1973 | Haigh | |
| 3,800,483 A | * 4/1974 | Sherman | 451/508 |
| 3,851,357 A | 12/1974 | Ribich et al. | |
| 4,227,350 A | 10/1980 | Fitzer | |
| 4,439,907 A | 4/1984 | Block et al. | |
| 4,551,189 A | 11/1985 | Peterson | |
| 4,774,788 A | 10/1988 | Shacham | |
| 4,907,169 A | 3/1990 | Lovoi | |
| 4,918,611 A | 4/1990 | Shyu et al. | |
| 4,939,439 A | 7/1990 | Dalglish | |
| 4,961,149 A | 10/1990 | Schneider et al. | |
| 4,978,830 A | 12/1990 | Millerick et al. | |
| 4,995,087 A | 2/1991 | Rathi et al. | |
| 4,998,005 A | 3/1991 | Rathi et al. | |
| 5,193,120 A | 3/1993 | Gamache et al. | |
| 5,380,978 A | 1/1995 | Pryor | |
| 5,505,747 A | 4/1996 | Chesley | |
| 5,580,634 A | 12/1996 | Stout et al. | |
| 5,725,423 A | 3/1998 | Barry | |
| 5,765,460 A | 6/1998 | Wathieu | |
| 5,766,277 A | 6/1998 | DeVoe et al. | |

(List continued on next page.)

FOREIGN PATENT DOCUMENTS

| | | |
|---|---|---|
| EP | 0937544 A2 | 8/1999 |
| GB | 1126136 | 9/1968 |
| WO | WO 91-04828 | 4/1991 |
| WO | WO 94/02284 | 2/1994 |

*Primary Examiner*—Hadi Shakeri
(74) *Attorney, Agent, or Firm*—Melissa E. Buss

(57) ABSTRACT

A surface treating article including a surface treating member and a fastener including a fiducial. The present invention also provides a preferred method of making a surface treating article that includes to a method of sensing the location of a fasteners on a surface treating web and thereafter cutting the surface treating web around the fastener to provide a surface treating article.

5 Claims, 12 Drawing Sheets

U.S. PATENT DOCUMENTS

| | | |
|---|---|---|
| 5,777,880 A | 7/1998 | Bowen et al. |
| 5,886,319 A | 3/1999 | Preston et al. |
| 5,931,729 A | 8/1999 | Penttila et al. |
| 5,951,389 A * | 9/1999 | Hettes et al. ............... 451/508 |
| 5,968,297 A | 10/1999 | Hooker et al. |
| 5,978,521 A | 11/1999 | Wallack et al. |
| 6,001,202 A | 12/1999 | Penttila et al. |
| 6,005,978 A | 12/1999 | Garakani |
| 6,064,759 A | 5/2000 | Buckley et al. |
| 6,432,796 B1 | 8/2002 | Peerson |

* cited by examiner

METHOD OF MAKING A SURFACE TREATING ARTICLE AND SUCH A SURFACE TREATING ARTICLE

CROSS REFERENCE TO RELATED APPLICATIONS

This application is a divisional of U.S. application Ser. No. 09/607210, filed Jun. 30, 2000 now U.S. Pat. No. 6,609,951, now allowed.

TECHNICAL FIELD

The present invention relates to generally to a method of making a surface treating article and such surface treating article, and more particularly to a method of sensing the location of a fastener on a surface treating web and thereafter cutting the surface treating web around the fastener to provide a surface treating article, and such a surface treating article.

BACKGROUND OF THE INVENTION

Machine vision and methods of employing machine vision are known in the art. For example, U.S. Pat. No. 6,005,978 (Garakani) describes an apparatus and method for a two-dimensional search for a model image using edge-based and area-based matching. U.S. Pat. No. 5,978,521 (Wallack and Michael) describes improved methods for determining a calibration relationship among the imaging reference frames of multiple cameras that acquire images of a common moveable object. U.S. Pat. No. 6,064,759 (Buckley et al.) teaches an automatic inspection method and apparatus using machine vision cameras to inspect a three-dimensional object.

Adaptive operations enabled by machine vision systems are also known in the art. For example, U.S. Pat. No. 5,777,880 provides a method and apparatus for correctively guiding an item on a desired path along a material. U.S. Pat. No. 5,380,978 (Pryor) describes the use of datums on three-dimensional objects for the purpose of optically guided positioning. U.S. Pat. No. 5,886,319 (Preston et al.) discloses a method and apparatus for guiding a laser cutter along a path on a patterned material using machine vision.

Various articles and methods for attaching fasteners to articles are known in the art. For example, U.S. Pat. No. 4,551,189 to Peterson discloses a friction welding fastener system for fusing a thermoplastic material fastener to a substrate by heat of friction induced through the application of rotative and axial forces applied to the fastener. A cavity is formed inwardly of the bottom surface of the thermoplastic base member and a heat activated adhesive material having a bonding affinity for both the base material and the substrate material is inserted into the cavity to form a layer having a thickness equal or greater than the thickness of the base member. The base member is rotated with sufficient rotative and axial forces to cause the heat activated adhesive layer to adhere to the substrate.

European Patent Application 0 937 544 A2 to Smith discloses a method of producing an abrasive treatment disc, whereby the disc is formed from an abrasive material ultrasonically welded to a mounting member.

U.S. Pat. No. 5,931,729 to Penttila et al. discloses a method of spin welding a fastener to an article and such an article. The fastener is melt-bonded to the back of the surface conditioning disc. The surface treating article comprises a working surface adapted to treat a workpiece surface, and a back surface, the back surface comprising an open woven scrim. In a preferred embodiment, the surface treating article has a nonwoven abrasive surface conditioning disc. The Penttila et al. reference states it is also possible for the surface treating article to be a coated abrasive disc, a polishing pad, a brush, or a similar surface treating element.

Applicant's copending U.S. patent application Ser. No. 09/551477, filed on Apr. 18, 2000, teaches a method of attaching a fastener to an abrasive article via spin welding and employing an intermediate thermoplastic adhesive layer.

U.S. Pat. No. 3,561,938 to Block et al. discloses an abrasive disk and a method of making an abrasive disk, which includes impregnating a compressible porous backing sheet matrix having a plurality of segments defining voids with a bonding material, which coats the segments to form a backing sheet. The backing sheet is then placed next to a hub and the two are heated and squeezed to compress the backing sheet and cause the bonding material to flow to bond the hub to the backing sheet. The large lamination may then be cut to form a number of the abrasive disks.

Surface conditioning discs having a threaded button bonded to the back side of the disc by an adhesive are available commercially as Roloc™ surface conditioning discs from Minnesota Mining and Manufacturing Company, St. Paul, Minn. These surface conditioning discs have an abrasive member and a fastener attached to the abrasive member by a layer of thermosetting adhesive. The fastener has a base and a threaded portion for attaching to a suitable back-up pad. These surface conditioning discs are assembled by first loading the fastener into heated fixture (typically 200-260° C.), such that the threaded portion of the fastener is held by the heated fixture and the base is exposed. The heated fixture heats the fastener. Next, a layer of thermosetting adhesive is applied to the fastener base, typically by spraying. After spraying the thermosetting adhesive, a circular or disc-shaped abrasive member is centered relative to the fastener held by the heated fixture and then makes contact with the layer of thermosetting adhesive on the fastener. The abrasive member and fastener are held in a compressive force until the layer of thermosetting adhesive has cured. Then, the surface conditioning disc is removed from the heated fixture.

Threaded fasteners for surface treating articles are taught in U.S. Pat. No. 3,562,968, "Surface Treating Tool," Johnson et al.

It has been known to cut coated abrasive webs with lasers to form coated abrasive discs.

SUMMARY OF THE INVENTION

One aspect of the present invention provides a method of making a surface treating article. The method comprises the steps of: a) providing a surface treating web with a fastener attached thereto; b) sensing the position of the fastener on the surface treating web; and c) cutting the surface treating web around the fastener to provide a surface treating article including the fastener.

In one preferred embodiment of the above method, step b) further comprises sensing the position of the center of the fastener and step c) comprises cutting the surface treating web around the center of the fastener to provide a surface treating article including the fastener centered thereon. In another aspect of this embodiment, step c) further comprises cutting the surface treating web around the fastener in the shape of a disc. In another preferred embodiment of the above method, step b) is performed using machine vision. In another aspect of this embodiment, the fastener includes a fiducial, and step b) further comprises using the machine vision to determine the position of the fiducial to thereby determine the position of the fastener on the surface treating web.

In another preferred embodiment of the above method, step c) further comprises laser cutting the surface treating web around the fastener to provide a surface treating article with the fastener thereon. In another preferred embodiment of the above method, the method further comprises: d) advancing the web forward to bring a second fastener attached to the surface treating web to within a desired region; and e) repeating steps b) and c) with regard to the second fastener to provide a second surface treating article. In another aspect of this embodiment, the method is a continuous method in which a plurality of fasteners are sequentially brought into the desired region, and steps b) and c) are then repeated with respect to each of the plurality of the fasteners.

In yet another preferred embodiment of the above method, step c) further comprises partially cutting the surface treating web around the fastener to provide a partially-cut surface treating article with the fastener thereon, and subsequently separating the surface treating article from the surface conditioning web. In another preferred embodiment of the above method, the method further comprises the step of attaching the fastener to the surface treating web prior to step a). In another aspect of this embodiment, the step of attaching the fastener to the surface treating web comprises spin welding. In another aspect of this embodiment, the fastener comprises a thermoplastic material. In yet another aspect of this embodiment, the step of attaching the fastener to the surface treating web comprises placing a thermoplastic layer of adhesive between the fastener and the surface treating web prior to spin welding. In another preferred embodiment of the above method, the surface treating web comprises a coated abrasive web.

Another aspect of the present invention provides an alternative method of making a surface treating article. This alternative method comprises the steps of: a) providing a surface treating web with a fastener attached thereto; b) thereafter laser cutting the surface treating web around the fastener to provide a surface treating article, including the fastener.

In one preferred embodiment of the above method, the method further comprising the step of sensing the position of the fastener on the surface treating web prior to step b). In another aspect of this embodiment, the method further comprises the step of determining the position of the center of the fastener on the surface treating web prior to step b). In another preferred embodiment of the above method, the method further comprises the step of determining the position of the center of the fastener prior to step b) and step b) comprises laser cutting the surface treating web around the center of the fastener to provide a surface treating article with the fastener centered thereon. In another aspect of this embodiment, step b) further comprises laser cutting the surface treating web around the fastener in the shape of a disc.

In another preferred embodiment of the above method, the method further comprises the step of using machine vision in sensing the position of the fastener on the surface treating web prior to step b). In another aspect of this embodiment, the fastener comprises a fiducial to determine the position of the fastener on the surface treating web using machine vision. In another preferred embodiment of the above method, the method further comprises the steps of: c) advancing the web forward to bring a second fastener attached to the surface treating web to within a desired region; and d) repeating step b) with regard to the second fastener to provide a second surface treating article. In another aspect of this embodiment, the method is a continuous method in which a plurality of fasteners are sequentially brought into the desired region, and steps b) and c) are then repeated with respect to each of the plurality of the fasteners. In yet another preferred embodiment of the above method, step b) further comprises partially laser cutting the surface treating web around the fastener to provide a partially-cut surface treating article with the fastener thereon, and subsequently separating the surface treating article from the surface treating web.

In another preferred embodiment of the above method, the method further comprises the step of attaching the fastener to the surface treating web prior to step a). In another aspect of this embodiment, the step of attaching the fastener to the surface treating web comprises spin welding. In another aspect of this embodiment, the step of attaching the fastener to the surface conditioning web comprises placing a thermoplastic layer of adhesive between the fastener and the surface conditioning web prior to spin welding. In another preferred embodiment of the above method, the surface treating web comprises a coated abrasive web.

Another aspect of the present invention provides a method of making a plurality of surface treating articles. The method comprises the steps of: a) providing a surface treating web with a plurality of fasteners fastened thereto; b) sensing the position of at least one of the plurality of fasteners on the surface treating web; and c) cutting the surface treating web around each of the plurality of fasteners to provide a plurality of surface treating articles, each including one of the plurality of fasteners.

In one preferred embodiment of the above method, each of the plurality of fasteners is located in a predetermined position forming an array of fasteners. In another aspect of this embodiment, the plurality of fasteners includes a first fastener and a second fastener, where step b) includes sensing the position of the first fastener and where the position of the second fastener is determined from the relative positions of the first fastener and the second fastener. In another aspect of this embodiment, step b) further comprises sensing the position of the first fastener with machine vision. In yet another preferred embodiment of the above method, step b) further comprises determining the position of the center of at least one of the plurality of fasteners and step c) comprises cutting the surface treating web around the centers of the plurality of fasteners to provide a plurality of surface treating articles each including one of the plurality of fasteners centered thereon. In another preferred embodiment of the above method, at least one of the plurality of fasteners includes a fiducial to determine the position of the at least one fastener on the surface treating web.

In yet another preferred embodiment of the above method, step c) further comprises laser cutting the surface treating web around the plurality of fasteners to provide a plurality of surface treating articles each including one of the plurality of fasteners thereon. In another preferred embodiment of the above method, step c) further comprises partially cutting the surface treating web around the plurality of fasteners to provide a plurality of partially-cut surface treating articles each including one of the fasteners thereon and subsequently removing the plurality of surface treating articles from the surface treating web.

In another preferred embodiment of the above method, the method further comprises the step of attaching the plurality of fasteners to the surface treating web in a predetermined array prior to step a). In another aspect of this embodiment, the step of attaching the plurality of fasteners to the surface treating web in a predetermined array comprises spin welding. In yet another aspect of this embodiment, the step of attaching the fasteners to the surface treating web comprises placing a thermoplastic layer of adhesive between the fastener and the surface treating web prior to spin welding. In another preferred embodiment of the above method, the surface treating web comprises a coated abrasive web.

Another aspect of the present invention provides a surface treating article. The surface treating article comprises: a) a surface treating member; and b) a fastener on the surface treating member including a drive member, where the drive member includes a distal end, where the distal end includes a fiducial located thereon.

In another preferred embodiment of the above surface treating article, the fiducial includes a first reflective surface and a non-reflective surface. In another aspect of this embodiment, the non-reflective surface is at an angle relative to the first reflective surface. In another aspect of this embodiment, the distal end of the fastener includes a second reflective surface. In yet another aspect of this embodiment, the non-reflective surface is at an angle relative to the first reflective surface and the second reflective surface. In yet another aspect of this embodiment, the first reflective surface and the second reflective surface are parallel.

In another preferred embodiment of the above surface treating article, the surface treating member comprises an abrasive member, and where the abrasive member includes a working surface and a back surface opposite the working surface. In another aspect of this embodiment, the working surface comprises a coated abrasive. In another preferred embodiment of the above surface treating article, the working surface comprises a non-woven surface.

Another aspect of the present invention provides an apparatus for making a surface treating article. The apparatus for making a surface treating article comprises: a) attaching means for attaching a fastener to a surface treating web; and b) cutting means for laser cutting the surface treating web around the fastener to provide a surface treating article.

Another aspect of the present invention provides an alternative apparatus for making a surface treating article. The apparatus for making a surface treating article comprises: a) a spinwelder for attaching a fastener to a surface treating web; b) machine vision system to determine the position of the fastener on the surface treating web; and c) a laser to cut the surface treating web around the fastener to provide a surface treating article with a fastener thereon. In one preferred embodiment of the above apparatus, the apparatus further includes: d) a web carrier for advancing the surface treating web.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
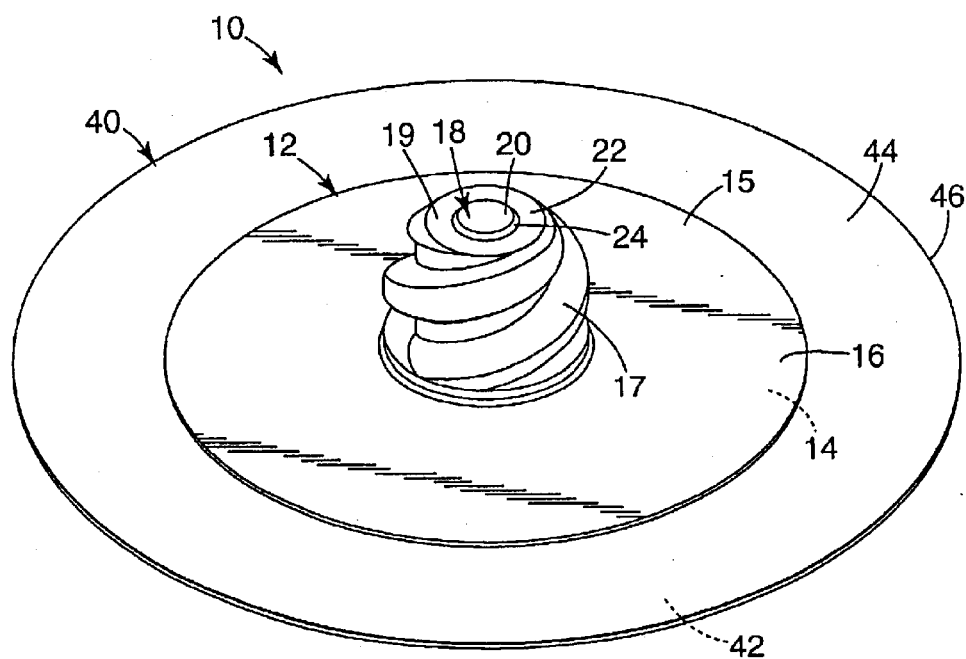
FIG. 1 is an isometric view of a preferred embodiment of a surface treating article according to the present invention.
Figure 2:
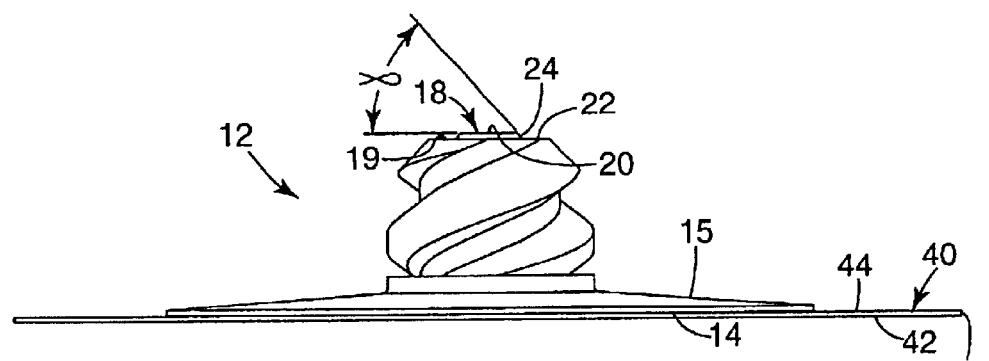
FIG. 2 is a side view of the surface treating article of FIG. 1.
Figure 3:
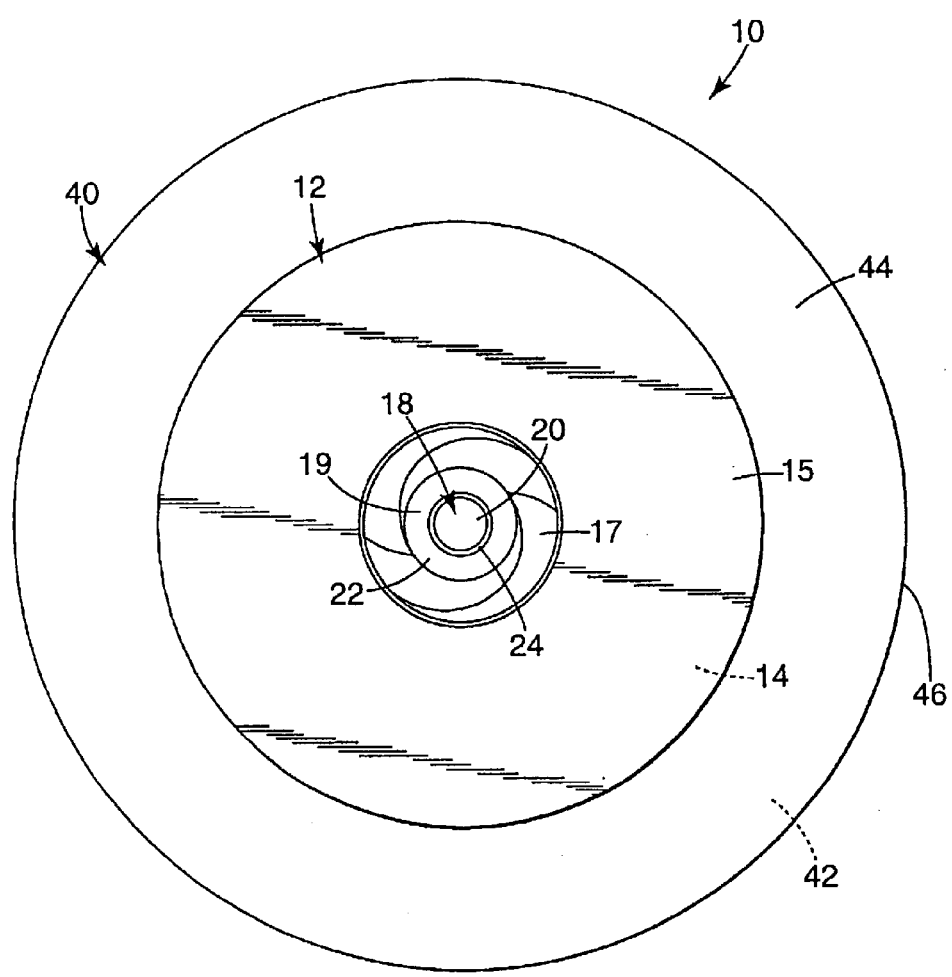
FIG. 3 is a top view of the surface treating article of FIG. 1.

A preferred embodiment of a surface treating article 10 of the present invention is illustrated in FIGS. 1-3. FIG. 1 is an isometric view of surface treating article 10. FIG. 2 is a side view of surface treating article 2. FIG. 3 is a top view of surface treating article 10.

The surface treating article 10 includes a surface treating member 40 and a fastener 12. The relative size of the surface treating member 40 to the fastener 12 may be different from what is illustrated in FIGS. 1-3.

The surface treating member 40 includes a working surface 42 and a back surface 44 opposite the working surface 42. The surface treating member 40 also includes a peripheral surface 46 extending between the working surface 42 and the back surface 44. As illustrated, the fastener 12 is attached to the back surface 44 of the surface treating member 40. Alternatively, the fastener 12 may be attached to the working surface 42 of the surface treating member 40.

The surface treating member 40 is illustrated in the shape of a circle. However, surface treating member 40 may be any shape. Preferably, the surface treating article 40 is a disc, which means it is capable of rotating about a drive member.

In the illustrated embodiment, the surface treating member 40 is a coated abrasive member 40. The back surface 44 includes a backing. A preferred backing is one that is thick enough, stiff enough and rugged enough to withstand the spin welding process. For example, suitable backings include a resin-impregnated cloth, a polymer-laminated cloth, or a polymer-impregnated paper. Coated abrasive members and their method of manufacture are well known to those skilled in the art. One example of a coated abrasive member 40 is illustrated in U.S. Pat. No. 5,766,277, "Coated Abrasive Article and Method of Making the Same," DeVoe et al., the entire disclosure of which is incorporated herein by reference. Alternatively, the surface treating member 40 could be a non-woven abrasive member 40. A non-woven abrasive member 40 includes fibers needle tacked into a woven scrim. A preferred non-woven abrasive member is described in detail in U.S. Pat. No. 3,688,453, "Abrasive Articles," Legacy et al., the entire disclosure of which is incorporated herein by reference.

Fastener 12 includes a generally planar base 15 and a drive member 17. The planar base 15 includes a generally planar surface 14 and a second surface 16 opposite the planar surface 14. In one preferred embodiment, the planar surface 14 of the fastener 12 has a diameter of approximately 3 cm (1.2 in), although larger and smaller fasteners are within the scope of the invention. As illustrated in FIG. 2, second surface 16 tapers slightly to be thinner at the outer edge of the fastener 12. Extending from the center of the second surface 16 is drive member 17. One preferred fastener 12 is disclosed in U.S. Pat. No. 3,562,968, "Surface Treating Tool," Johnson et al., the entire disclosure of which is incorporated herein by reference. Drive member 17 is configured for attaching the surface treating article 10 to a desired power tool. In a preferred embodiment, the drive member 17 is a threaded stud, which fits with a corresponding female threaded backup pad (not illustrated). A suitable back-up pad is available commercially as a Roloc™ disc pad from Minnesota Mining and Manufacturing Company, St. Paul, Minn.

Preferably, a fiducial 18 is located on the fastener 12. More preferably, a fiducial 18 is located on the distal end of drive member 17 on distal end surface 19. "Fiducial" is used herein, including the claims, to describe any line, mark or shape that is used as a standard of reference for sensing a location. For example, fiducial 18 is used to sense the location of fastener 12 on a surface treating web, which is described in greater detail below.

Preferably, fiducial 18 includes first reflective surface 20 and a non-reflective surface 24. More preferably the first reflective surface 20 and the non-reflective surface 24 are concentric. Most preferably, the first reflective surface 20 is in the shape of a circle and the non-reflective surface 24 is in the shape of an annulus surrounding the first reflective surface 20. The non-reflective surface is preferably at an angle α measured relative to the first reflective surface 20. Preferably, α is between 20° and 70°. More preferably, α is between 30° and 60°. Most preferably, α is 45°. The distal end surface 19 of the drive member 17 includes a second reflective surface 22. Preferably, the first reflective surface 20 and the second reflective surface 22 are parallel to one another. As illustrated in FIG. 3, the non-reflective surface 24 is located between the first reflective surface 20 and the second reflective surface 22. Preferably, the non-reflective surface 24 and second reflective surface 22 are concentric. More preferably, the second reflective surface 22 is the shape of an annulus surrounding the non-reflective surface 24.

Preferably, fastener 12 is made of a thermoplastic material. Examples of suitable thermoplastic materials include nylon and polyamides. Alternatively, fastener 12, may be made of a metal. A suitable metal is steel.

Preferably, the fastener 12 is spin welded directly onto the surface treating member 40. Methods of spin welding are known in the art. Generally, spin welding includes placing the fastener 12 and surface treating member 40 in contact with one another and then rotating the fastener 12 and surface treating member 40 relative to one another so as to soften the material of the fastener 12 to form a melt bond between the fastener 12 and surface treating member 40. For example, one method of spin welding a fastener to a surface treating article is disclosed in U.S. Pat. No. 5,931,729 to Penttila et al., the entire disclosure of which is incorporated herein. The preferred spin welding method for the fastener 12 and surface treating member 40 is described below.

Another suitable method of attaching the fastener 12 to the surface treating member 40 is disclosed in U.S. patent application Ser. No. 09/551,477 (Fritz et al.), filed on Apr. 18, 2000, the entire disclosure of which is incorporated herein. This patent application generally discloses a method of attaching a fastener to a surface treating member by first placing a layer of adhesive between the fastener and surface treating member. Then, the fastener and surface treating member are spin welded together with the layer of adhesive between them, so as to soften the layer of adhesive. Upon cooling, the layer of adhesive forms a bond between the fastener and the surface treating member 40. Preferably, the adhesive is a thermoplastic adhesive.

Another suitable method of attaching the fastener 12 to the surface treating member is by using a layer of thermosetting adhesive between the fastener 12 and the surface treating member 40, which is cured by heat. However, the method of attaching the fastener 12 to the surface treating member 40 is not critical and the fastener 12 may be attached to the surface treating member 40 in any way known to those skilled in the art.

Figure 4:
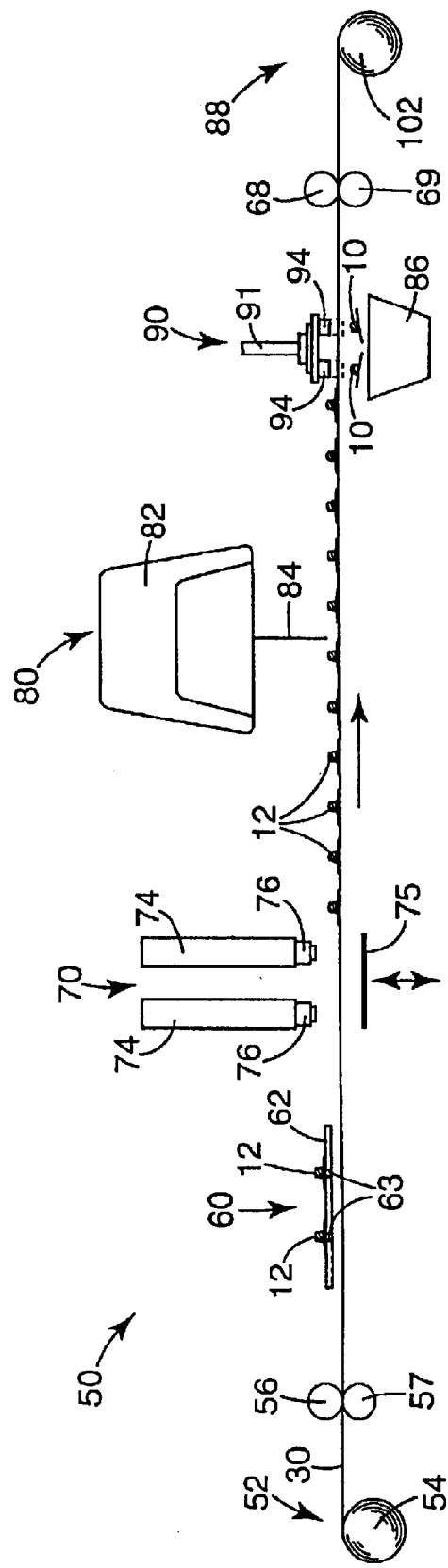
FIG. 4 is a schematic side view of an apparatus and method for making a surface treating article according to the present invention.

FIG. 4 is a schematic side view of an apparatus 50 and method for making a surface treating article 10 according to the present invention. The apparatus 50 includes an unwind assembly 52, a fastener loading station 60, a spin weld station 70, a machine vision and cutting station 80, a separation station 90, and a wind assembly 88. The surface treating web 30 is moved intermittently through the apparatus 50 as it progresses through each station. Preferably, the time a portion of the web 30 spends at each station is approximately equal to allow a smooth and even progression of the web 30 through apparatus 50.

As illustrated in FIG. 4, a length of surface treating web 30 is initially provided in unwinding assembly 52 on surface treating web roll 54 in roll form. Preferably, roll 54 includes a brake. The brake is set to inhibit roll 54 from freely rotating, but instead to rotate with a slight amount of resistance. The web 30 progresses from roll 54 to an assembly formed by upper roll 56 and lower roll 57. The web 30 then progresses to the fastener loading station 60 of the apparatus 50. Platen 62 is located above the web 30. The fasteners 12 are loaded onto the platen 62 in predetermined locations to form two rows of fasteners 12. Platen 62 includes a vacuum (not shown) and vacuum holes 63, which hold the fasteners 12 in their predetermined locations while they are being transferred to the spin welders 74 in spin weld station 70. The relative locations of the fasteners 12 on the platen 62 are arranged to coordinate with the locations of the two rows of spin welders 74 in spin weld station 70. Platen 62 delivers the two rows of fasteners 12 to the spin weld station 70 of the apparatus. While the platen 62 delivers the fasteners 12 to the spin weld station 70, the web 30 advances forward to provide an area for the fasteners 12 to be spin welded and stops under the spin weld station 70. The fasteners 12 are lifted into chucks 76 on the bottom ends of the spin welders 74 and the platen 62 retreats back to its original position to receive more fasteners 12. Plate 75 is located below the web 30 opposite the spin welders 74. Plate 75 moves up vertically to support the web 30 just prior to when the spin welders 74 attach fasteners 12 to the web 30. The spin welders 74 spin weld the fasteners 12 onto the surface treating web 30. The web is stationary while the fasteners 12 are spin welded onto the web. Afterwards, plate 75 moves down vertically away from the web 30.

After the fasteners are spin welded, the web advances forward to the machine vision and cutting station 80 of the apparatus 50. The web 30 comes to a stop to remain stationary under the machine vision and cutting station 80. The machine vision system 82 senses the position of the fasteners 12 on the web 30 that were spin welded onto the web at the previous station. Next, the laser 84 partially cuts the web 30 around each of the fasteners 12 to form partially cut surface treating articles 10. The web 30 then starts again and proceeds from the machine vision and cutting station 80 to the separation station 90 of apparatus 50. The hollow cylinders 94 of the upper ram assembly 91 mechanically separate the partially cut surface treating articles 10 from the web 30. The separated surface treating articles 10 fall into the receiving bin 86. The web progresses from the separation station 90 to the nip assembly formed between the upper and lower web rolls 68, 69. Finally, the remaining web then progresses from the nip assembly formed between the upper and lower web rolls 68, 69 to the wind assembly 88, where the remaining web 30 is wound around the surface treating web roll 102. Preferably, roll 102 includes a motor for winding the web around the roll.

Preferably, the surface treating web 30 is an abrasive web. More preferably, abrasive web may be either a coated abrasive web or a non woven abrasive web. Preferably, the web 30 is between 2 and 60 inches wide. More preferably, the web 30 is between 15 and 36 inches wide. However, the web width could vary depending on the number and size of fasteners 12 attached to the web 30 and the size of the finished surface treating article 10.

Preferably, portions of the web 30 move intermittently between the individual stations at approximately the same speed. Preferably, the average speed of the web 30 is between 5 and 150 inches/minute through apparatus 50, and more preferably between 25 and 75 inches/minute through apparatus 50. The average speed is calculated taking into account the web acceleration from a stationary position at one station and web deceleration to a stationary position at an adjacent station.

Figure 5:
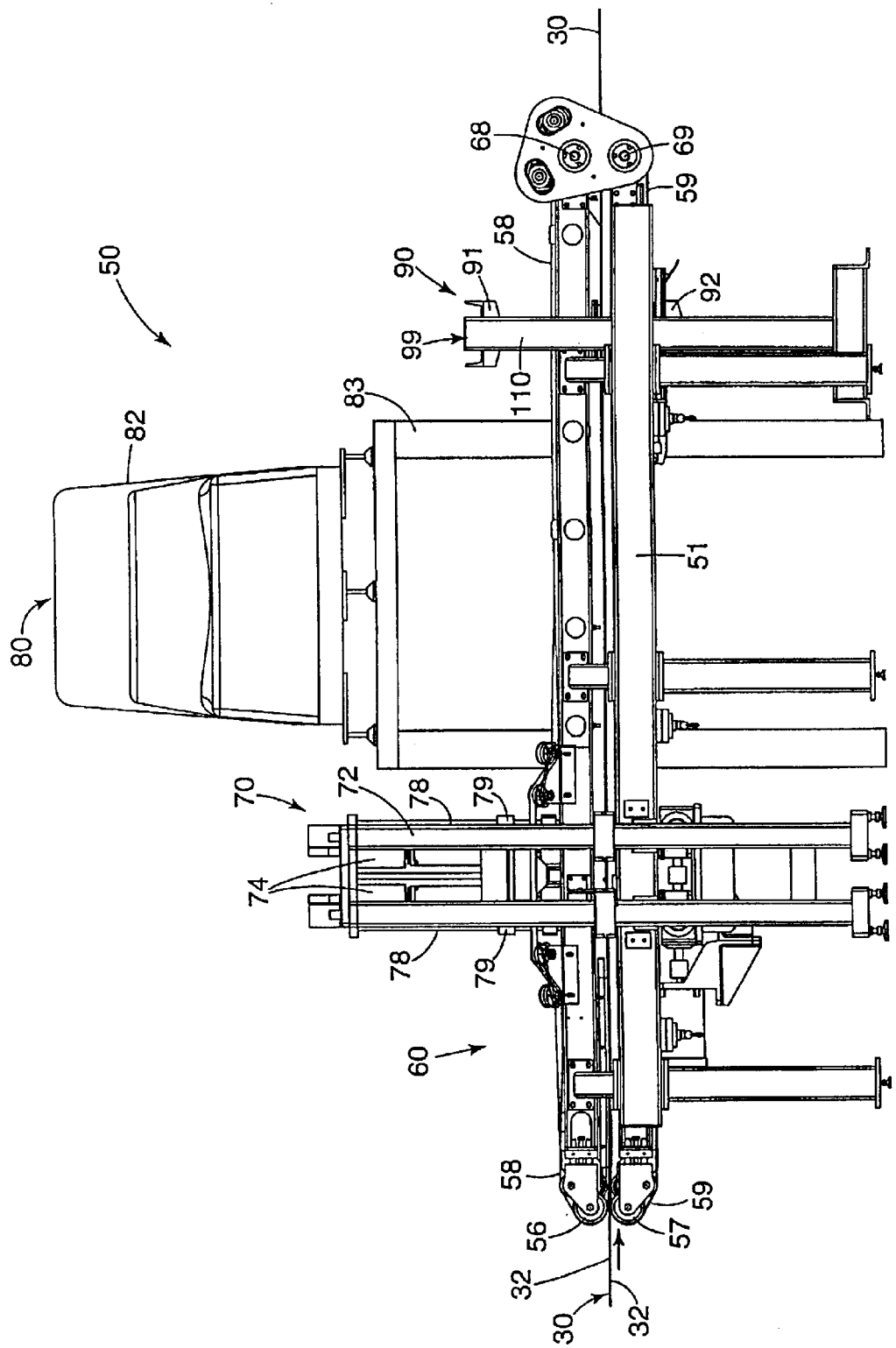
FIG. 5 is a side view of a preferred apparatus for carrying out the method of the present invention.

FIG. 5 illustrates one preferred embodiment of apparatus 50. The unwind assembly 52 and wind assembly 88 are not illustrated. The apparatus 50 includes the fastener loading station 60, spin weld station 70, machine vision and cutting station 80, and separation station 90. FIGS. 6-13 illustrate each of these stations of the apparatus 50 in more detail.

As seen in FIG. 5, frame 51 extends between the fastener loading station 60 and the separation station 90. Upper web roll 56 and lower web roll 57 are mounted on one end of the frame 51. Upper web roll 68 and lower web roll 69 are mounted on the opposite end of the frame 51. Two upper belts 58 are wrapped around opposing ends of upper roll 56 and upper roll 68. Two lower belts 59 are wrapped around opposing ends of lower roll 57 and lower roll 69. Upper web rolls 56, lower web rolls 57, upper belts 58, and lower belts 59 form a web carrier for moving the web 30 through apparatus 50. As upper rolls 56, 68 and lower rolls 57, 69 are rotated, upper and lower belts 58, 59 progress the web 30 through the fastener loading station 60, the spin weld station 70, the machine vision and cutting station 80, and the separation station 90 of apparatus 50. Preferably, the upper and lower belts 58, 59 are in contact with the opposing edges of the web 30. However, many arrangements for moving web 30 through the apparatus 50 are within the invention. For instance, the web carrier may include a drive shaft 68 driven by a motor, upper and lower rolls 56, 57, which are both idle, and upper and lower belts 58, 59. Drive shaft 68 may be connected to lower roll 69, and both drive shaft 68 and lower roll 69 will drive the belts 58, 59 to move the web 30 through the apparatus 50 in the direction of the arrow.

In the spin weld station 70, spin welder stand 72 holds a plurality of spin welders 74 directly above the moving web 30. In the machine vision and cutting station 80, the stand 83 holds the machine vision system 82 and laser cutting system 84 directly above the moving web 30. In the separation station 90, stand 110 holds the separation apparatus 99. The separation apparatus 99 includes an upper ram assembly 91 and a web back up assembly 92. The upper ram assembly 91 is positioned above the moving web 30. The web back up assembly 92 is located below the moving web 30 opposite the upper ram assembly 91.

Figure 6:
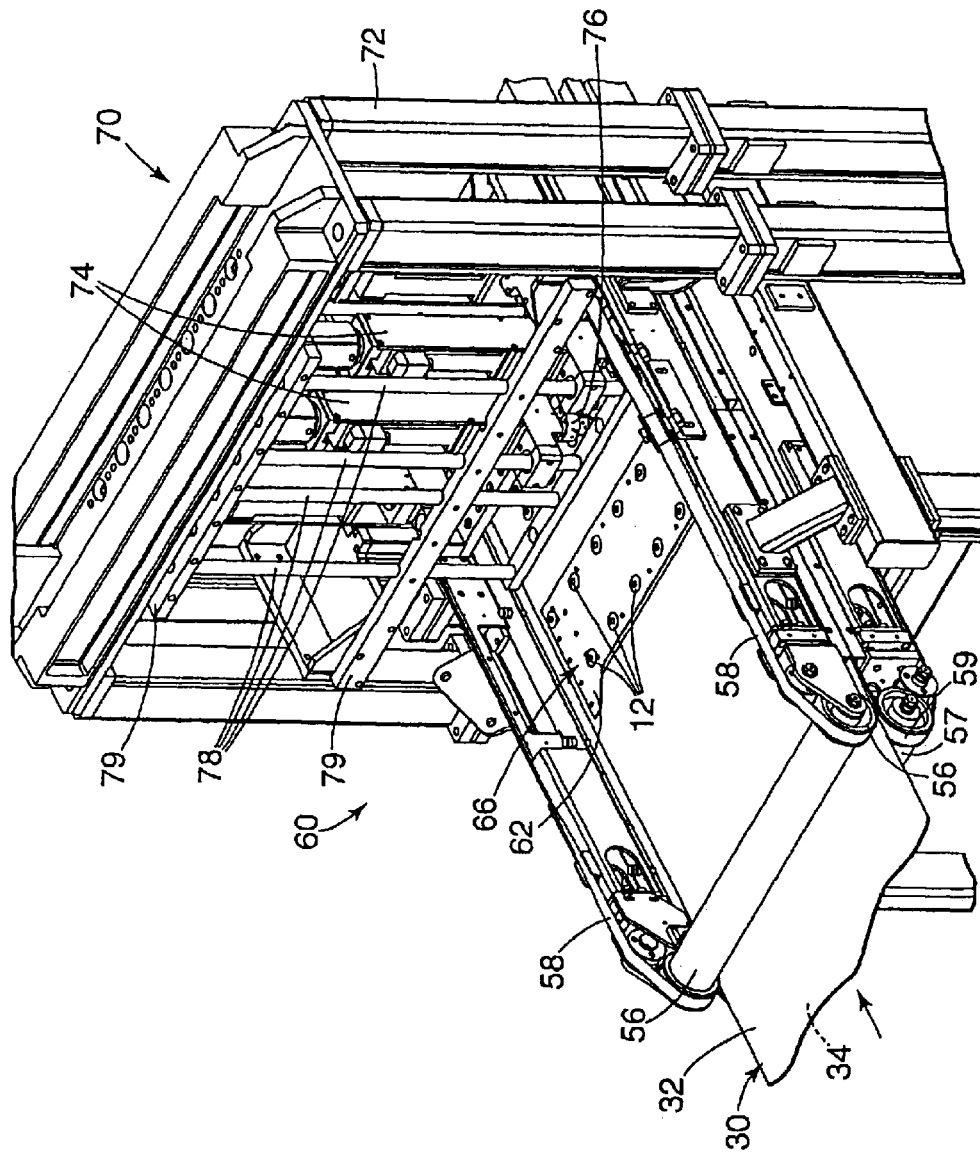
FIG. 6 is an isometric view of the fastener loading station of the apparatus of FIG. 5, prior to loading the fasteners into the spin weld station.

FIG. 6 illustrates the fastener loading station 60 and the spin weld station 70 in more detail. The web 30 progresses through an assembly formed between the upper and lower roll 56, 57. The two upper belts 58 rotate about the ends of upper web roll 56. Two lower belts 59 rotate about the ends of lower web roll 57. As the belts 58, 59 are rotated by upper and lower rolls 56, 57, the web 30 progresses through the apparatus 50.

Figure 9:
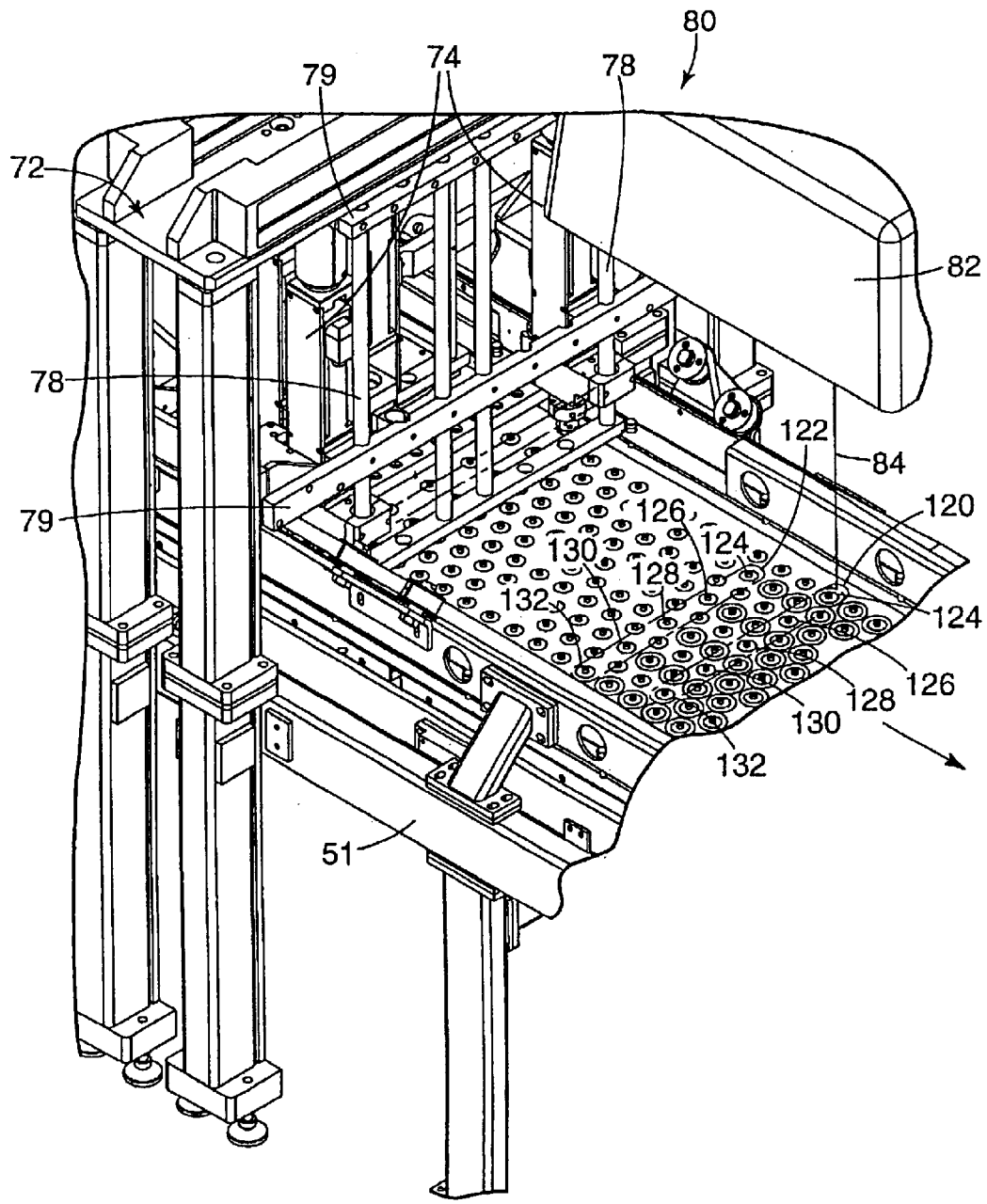
FIG. 9 is an isometric view of the exit side of the spin weld station of the apparatus of FIG. 5, prior to entering the machine vision and cutting station.
Figure 11:
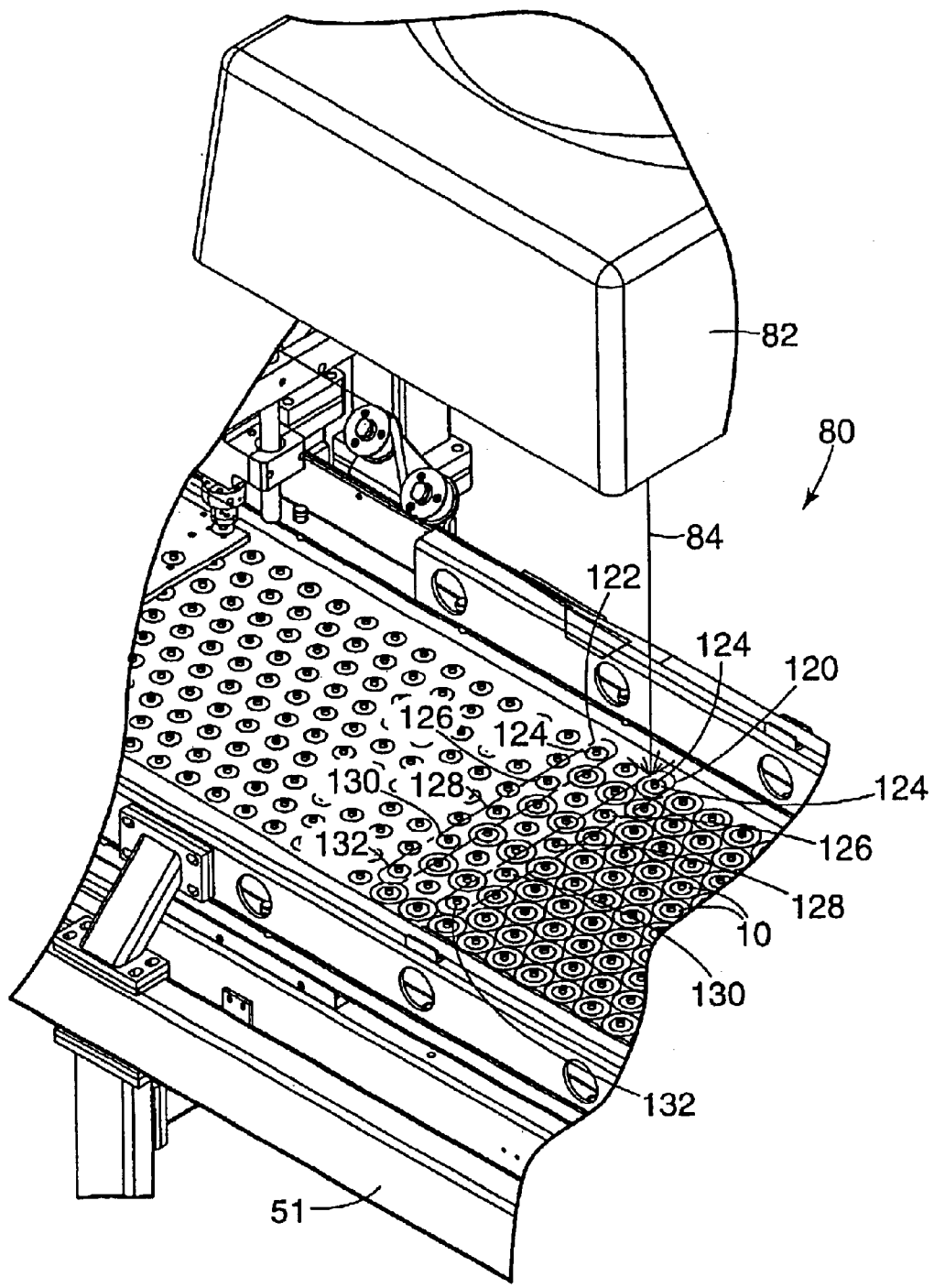
FIG. 11 is an isometric view of the machine vision and cutting station of the apparatus of FIG. 5.

In the fastener loading station 60, the fasteners 12 are loaded onto platen 62 in predetermined locations. A vacuum (not shown) holds the fasteners 12 in their respective locations. Preferably, the fasteners are arranged relative to each other to coordinate with the location of the chucks 76 in the spin welders 74 located in stand 72. Preferably, the fasteners are arranged in a first array 120 and a second array 122 (as shown in FIGS. 9 and 11). More preferably, each array 120, 122 is a row of fasteners, with each row offset from the other. Each row is illustrated as having five fasteners. However, more or less fasteners may be used depending on the number of spin welders 74 in stand 72.

As illustrated, stand 72 may hold up to a total of thirteen spin welders 74. More or less spin welders 74 may be used depending on the size of the finished surface treating articles 10 and the width of the web 30. The first row of spin welders 74, closest to the fastener loading station 60, may contain up to six spin welders. However, for clarity in the drawing, only two spin welders 74 are illustrated. The second row of spin welders 74, located opposite the first row, may contain up to seven spin welders 74. However, for clarity, only two of the seven spin welders 74 are shown. The second row of spin welders may be seen more clearly in FIG. 9. Stand 72 includes a vertical stationary bar 78 located both in front and behind each spin welder 74. However, for clarity in the drawing, some of the bars 78 have been removed. As the spin welders 74 move vertically to spin weld a fastener 12 onto the web 30, the spin welder 74 slides up and down stationary bars 78. Horizontal support bars 79 support the ends of the stationary bars 78 within stand 72.

Figure 7:
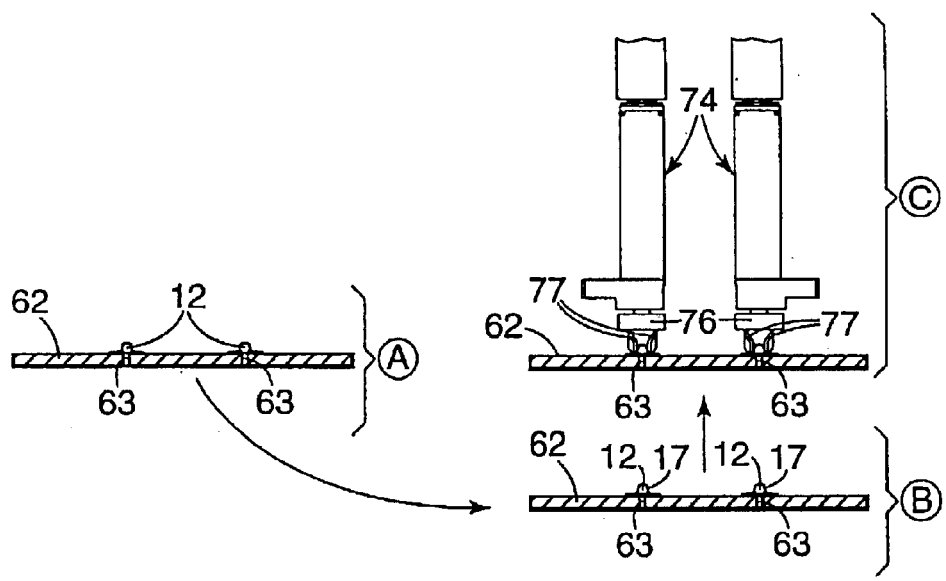
FIG. 7 is a partially schematic side view of the platen loading the fasteners into the rows of spinwelders.

FIG. 7 is a schematic illustration of how the platen 62 loads the fasteners 12 into the spin welders 74. The chucks 76 of the spin welders 74 are illustrated in cross-section to show the grip arms 77 within the chucks 76. In position A, the fasteners 12 are loaded onto the platen 62 in their predetermined positions. The predetermined positions coordinate generally with the relative locations of the chucks 76 of the spin welders 74. After the fasteners 12 are loaded, the vacuum (not shown) is turned on to hold the fasteners 12 in their respective positions through vacuum holes 63. The platen then moves to position B, which is located directly below the spin welders 74. The fasteners 12 are now in position directly below the chucks 76 of the spin welders 74. Next, the platen moves into position C, inserting the drive members 17 of fastener 12 directly into the grip arms 77 of the chuck 76. The vacuum is then turned off to release the fasteners 12. The grip arms 77 are preferably spring loaded to grasp the drive members 17 when the platen 62 moves back to position A to receive more fasteners 12. Mechanisms for moving the platen 62 as described herein are well known to those skilled in the art.

Figure 8:
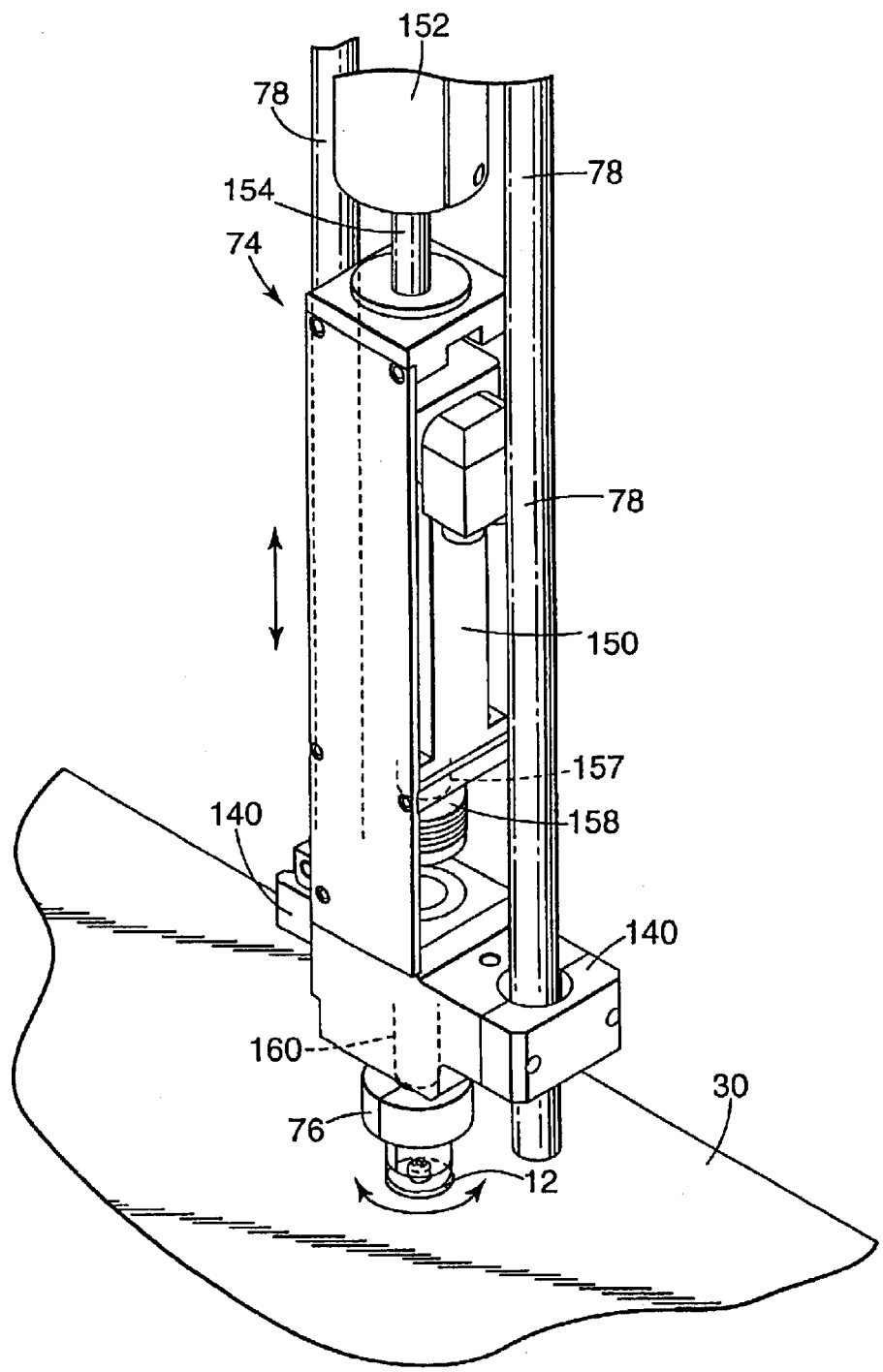
FIG. 8 is an isometric view of an individual spin welder in the apparatus of FIG. 5, illustrating the fastener spin welded onto the surface treating web.

FIG. 8 illustrates one of the spin welders 74 in stand 72 (shown in FIG. 6) spin welding a fastener 12 onto the web 30. The spin welder 74 includes a rotary motor 150 and vertical drive mechanism 152. Drive mechanism 152 is attached to support bar 79 (not shown). In a preferred embodiment, the drive mechanism 152 is an air cylinder. Two stationary bars 78 extend from the support bar 79 on either side of the spin welder 74. The motor 150 is mounted via a slidable frame 140 to the stationary bars 78 to allow the slidable frame 140 and motor 150 to be driven vertically by the rod 154 extending from the air cylinder 152. Extending from the motor 150 is a first shaft 157. The first shaft is coupled to a second shaft 160 by coupling 158. Mounted at the distal end of the second shaft 160 is a chuck 76 for holding the fastener 12. It is thus seen that the motor 150 spins first shaft 157, second shaft 160, and chuck 76; and that all of these components, along with the slidable frame 140, are raised and lowered together in response to actuating the drive mechanism 152.

Chuck 76 can be any suitable fixture that will hold the fastener 12 during the spin weld operation. Chuck 76 must grip the fastener 12 securely enough to avoid slippage of the fastener 12 within the chuck 76 when the fastener is spun against the surface treating web 30. Chuck 76 should also provide for easy release of the fastener 12 after the spin weld process. Chuck 76 thus may include moveable elements for gripping and releasing the fastener 12, as is well known in the art.

The forward travel of the web 30 stops below the spin welders 74 by upper and lower belts 58, 59. Plate 75 located below the web 30 (illustrated in FIG. 4) raises up to support the web 30 opposite the spin welders 74. While the web 30 is held stationary below the spin welders 74, the spin welders 74 spin weld the fasteners 12 to the web 30. After the fasteners 12 are attached to the web 30, plate 75 lowers to allow the web 30 to move to the machine vision and cutting station.

A preferred method of spin welding the fastener 12 to the surface treating web 30 is as follows. In general, the spin weld method comprises the steps of holding stationary the surface treating web 30, mounting the fastener 12 in a chuck 76 to be driven by the spin welder 74, accelerating the chuck 76 and fastener 12 to the desired rotational speed, activating the drive mechanism 152 to move the planar surface 14 of the fastener 12 into contact with the surface treating web 30, applying sufficient force between the fastener 12 and surface treating web 30 while the fastener is spinning to achieve a frictional temperature required to soften the planar surface 14, allowing the chuck 76 and fastener 12 to stop rotation, maintaining force between the fastener 12 and surface treating web 30 while the planar surface 14 of the fastener 12 sufficiently cools to form a bond between the fastener 12 and surface treating article web 30, and releasing the fastener 12 from the chuck 76. The surface treating web 30 is mechanically held stationary between the upper and lower belts 58, 59 (not shown) to keep the web 30 stationary during the spin welding process. Optionally, adhesive may be placed between the planar surface 14 of the fastener 12 and the surface treating web 30 prior to spin welding them together so as to form an adhesive bond between the fastener 12 and surface treating web 30.

The following parameters are preferred when spin welding a nylon fastener 12 on a coated abrasive web with a backing comprising a resin-impregnated cloth or polymer-backed cloth. The parameters found to affect the strength of the melt-bond between the fastener 12 and surface treating web 30 are as follows. The force that the chuck 76 applies to the system is preferably between about 250 and 1100 lb., more preferably between about 300 and 700 lb., and most preferably between about 350 and 500 lb. The speed of the motor 150 is preferably between about 500 and 8000 RPM, more preferably, between 2000 and 6000 RPM, and most preferably, between about 2500 and 4500 RPM. The spin time is preferably between about 0.05 seconds and 0.6 seconds. More preferably, the spin time is preferably between about 0.2 seconds and 0.45 seconds. The spin time is a measurement of how long the rotary motor 150 is maintained under power from the time the chuck 76 is positioned vertically within approximately 0.125 inches or less from the web 30 (essentially at the time of contact between the fastener 12 and the web 30) and ends with the command to remove power from the motor 150 after the fastener 12 contacts the surface treating web 30. After the power is removed from the rotary motor 150, the force between the fastener 12 on the web 30 must be maintained for a period of dwell time to form a sufficient bond between the fastener 12 and the web 30. Preferably, the dwell time is between 0.1 and 1 seconds, and more preferably, between 0.2 and 0.5 seconds.

FIG. 9 illustrates the web 30 and fasteners 12 attached to web 30 as it exits the spin weld station 70 in the direction of the arrow to enter the machine vision and cutting station 80. The first row of spin welders 74 attach fasteners 12 arranged in a first array 120. The second row of spin welders 74 simultaneously attach fasteners 12 arranged in a second array 122. Each array 120, 122 contains a first fastener 124, a second fastener 126, a third fastener 128, a fourth fastener 130, and a fifth fastener 132. Preferably, the fasteners in each array 120, 122 are spaced equally from each other. The spin welding stand 72 may hold up to thirteen spin welders, thus allowing thirteen fasteners to be simultaneously spin welded to the web. However, for clarity the web is illustrated as having only ten fasteners welded to it in the first and second arrays 120, 122. The first and second arrays 120, 122 are located some distance relative to one another and offset from one another so that other arrays of fasteners may be spin welded between them, as the web 30 progresses through the spin weld area 70. The arrays of fasteners 12 are arranged so as to optimize the number of surface treating articles formed from the web 30 and to reduce web waste.

Because the spin welders 74 are mounted in fixed positions in the stand 72, the fasteners 12 are spin welded in predetermined positions on the web. This is convenient for sensing the positions of the fasteners 12 and cutting around the fasteners 12 on the web 30 to make surface treating articles 10.

When the web enters the machine vision and cutting station 80, illustrated in FIG. 11, the machine vision system 82 scans the web 30 to sense where the fasteners 12 are located on the web 30. Preferably, the machine vision system 82 includes two cameras, which take digital images of the web 30 in two different locations. More preferably, the first camera takes a digital image of the first array 120 of fasteners 12 located on the web 30 and the second camera takes a digital image of the second array 122 of fasteners 12 located on the web 30. Most preferably, the first camera takes a digital image of the first fastener 124 in the first array 120 and the second camera takes a digital image of the fifth fastener 132 in the second array 122. The cameras send the output to the machine vision system computer processor, which processes the images to determine the location of the fasteners 12. The computer processor then determines the coordinates of the first fastener 124 in first array 120 and the fifth fastener 132 in the second array 122. These coordinates are then sent to the laser system, which directs where the laser 84 is to cut. Laser 84 then cuts the web around the each of the fasteners to form surface treating articles 10, as illustrated in FIG. 11. Preferably, the computer processor may determine the coordinates of the centers of the fastener 12 to allow laser 84 to cut around the centers of the fasteners 12 to form surface treating articles with fasteners 12 centered thereon.

Figure 10:
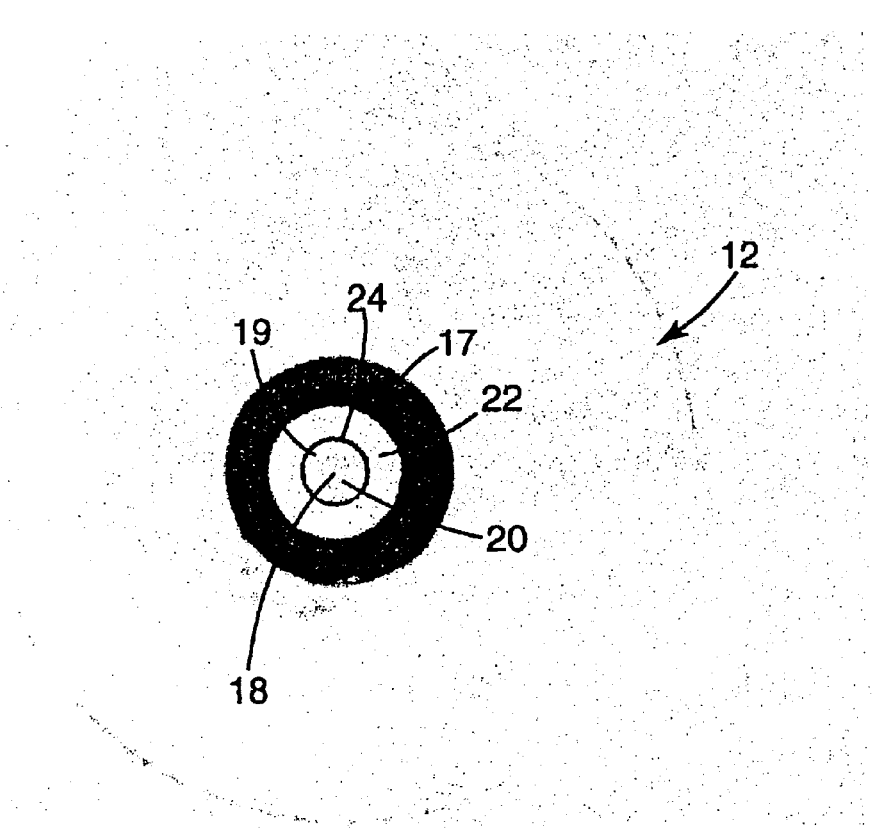
FIG. 10 is a digitally recorded image showing a top view of the fastener of FIG. 1 on the surface treating web using machine vision.

FIG. 10 is a digitally recorded image showing the view of a fastener on the surface treating web using the camera in the machine vision system 82. The fiducial 18 located on the distal end of the drive member is used to sense the position of the fastener on the web 30. Specifically, the machine vision system searches for the pattern the fiducial 18 on the fastener 12 creates. The machine vision system camera includes a ring light, which shines directly onto the web 30 and fastener 12 from around the camera. The camera in the machine vision system records the digital image illustrated in FIG. 10. The camera image is preferably in a gray scale image. The areas of the fastener that are perpendicular to the direction of the light will reflect the light back, producing white areas. The areas of the fastener that are at an angle other than perpendicular to the direction of the light, will reflect the light away, producing black or gray areas. The fiducial 18 includes a first reflective surface 20 and non-reflective surface 24. The term "reflective" refers to the surface reflecting light back to the camera. The term "non-reflective" refers to the surface reflecting light away from the camera. The first reflective surface 20 is preferably perpendicular to the direction of the light and preferably parallel to the web direction. The non-reflective surface 24 is preferably at some angle other than perpendicular to the direction of the light and not parallel to the web direction. Preferably, the non-reflective surface 24 is at angle a between 20° and 70° measured relative to the first reflective surface 20. More preferably, $\alpha$ is between 40° and 50°. Most preferably, $\alpha$ is 45°. The distal end surface 19 of the distal end of the drive member 17 includes the second reflective surface 22, which is preferably perpendicular to the direction of the light and parallel to the web direction. As a result, the first and second reflective surfaces 20, 22 reflect light to the camera, producing white areas, and the non-reflective surface 24 does not reflect light to the camera, producing a black area. Since the non-reflective surface 24 is located between the first and second reflective surfaces 20, 22, this creates a clear image for which the machine vision 82 system scans.

Preferably, the first reflective surface 20 is in the shape of a circle and reflects back a white circle. Preferably, the non-reflective surface 24 is in the shape of an annulus surrounding the first reflective surface 20 and causes a black annulus centered around the white circle. Preferably the second reflective surface 22 is in the shape of an annulus surrounding the non-reflective surface 24 and reflects back a white annulus centered around the black annulus. The combination of these three features in the image creates a pattern of a "bull's eye" which the machine vision system scans for on the web 30. Using this image, the computer can then determine the location of the fastener 12 on the web. Once the position of the fastener 12 is determined, the position of the fastener is sent to the laser control system.

Then, the laser is directed to cut around the fastener to form a surface treating article 10. Preferably, machine vision system computer may determine the position of the center of the fastener using the same image. Once the position of the position of the center of the fastener 12 is determined, the output is sent to the laser control system. Then, the laser is directed to cut around the center of the fastener to form a surface treating article with the fastener 12 centered thereon.

Any commercially available machine vision system 82 capable of obtaining the conditions described herein may be used, such as the Acuity™ VP-2000 available from RVSI Acuity, Inc. located in Nashua, N.H. Another suitable machine vision system 82 includes DVT Series 600 available from DVT, Inc. located in Norcross, Ga.

FIG. 11 illustrates the machine vision and cutting station 80 of the apparatus 50. Preferably, the web 30 advances until the arrays 120, 122 of fasteners 12 that were simultaneously attached by spin welders 74 on the web 30 are underneath the machine vision and cutting system. The web then stops and is held stationary while the locations of the fasteners 12 on the web are sensed and while the laser 84 cuts the web 30 around the fasteners.

The laser 84 cuts around the fasteners 12 located on the web 30 to form surface treating articles 10. The laser 84 is illustrated as starting to cut around the first fastener 124 of the first array of fasteners 120. The laser will then continue to cut around the second fastener 126 and proceed to the third, fourth and fifth fasteners 128–132 in the first array 120 before proceeding to cut around the fasteners 124–132 in the second array 122.

Each fastener 12 may be sensed individually as mentioned above prior to cutting around each fastener 12. However, it is also possible to sense only one or some of the fasteners 12 within an array of fasteners and then to determine location of all of the fasteners 12 in the array prior to cutting around each fastener within the array. For instance, if an array of fasteners included only a first fastener and a second fastener and it is known that the first fastener and second fastener are located a certain distance and direction from one another on the web 30, then once the position of the first fastener has been sensed, the position of the second fastener may be determined from the relative positions of the first fastener and the second fastener.

Referring to FIGS. 9 and 11, the fasteners 12 in each array 120, 122 were simultaneously spin welded to the web 30 by spin welders 74. Therefore, the positions of the fasteners in the arrays 120, 122 coordinate with the relative positions of the chucks 76 in the spin welders 74 in stand 72. Preferably, the chucks 76 are spaced equally so that the fasteners are spaced equally from each other in one direction. Because the distance and direction between the fasteners in arrays 120, 122 are known and the total number of fasteners 12 in each array 120, 122 are known, then the position of each of the fasteners 12 in the first and second arrays 120, 122 may be determined by: 1) sensing the location of the first fastener 124 in the first array 120 on the web 30; 2) sensing the location of the fifth fastener 132 in the second array 122 on the web 30; and 3) calculating the position of each of the fasteners 12 in the arrays 120, 122 based on the known factors. Once the position of each of the fasteners 12 within the arrays 120, 122 have been determined, the laser 84 will cut around the fasteners to form surface treating articles 10. Alternatively, if the cutting pattern for all of the fasteners 12 in the arrays 120, 122 is entered into the laser control system, then the laser may cut that pattern after it receives the sensed locations of the first fastener 124 in the first array 120 and the fifth fastener 132 in the second array 122 on the web 130, without calculating the position of each of the fasteners 12 in the arrays 120, 122.

Preferably, the fiducial 18 is centered relative to the drive member 17. The benefit of having the fiducial 18 centered relative to the drive member 17 is that the laser 84 may cut a nearly perfectly centered surface treating article with the fastener 12 centered thereon. This allows for final surface treating article which will wear more evenly over time in comparison to a surface treating article having a fastener that is not centered.

Preferably, the laser partially cuts the web 30 around the fasteners 12 to form a partially cut surface treating article 10. Preferably, the laser 84 cuts partially through the thickness of the web 30 so that the surface treating article 10 stays with the web until it is received at the separation station 90. If the surface treating web is a coated abrasive web, the laser preferably cuts through the backing on the back surface, but not the abrasive coating on the working surface of the web. Alternatively, the laser 84 may cut all the way through the web 30 to separate the surface treating articles 10 from the web completely, and thus, eliminating the need for the separation station 90.

A suitable laser system includes a laser generator coupled to required services, a beam delivery system, and a work surface containing or attached to an exhaust system. Preferably, the beam delivery system of laser 84 includes the following parameters: a galvanometer-based or other scanning optical-based system, minimum of 50 mm aperture, a focused beam size of less than $300 \times 10^{-6}$ m in diameter, minimum field size of 15 inches, power capability of 2500 watts, speed of mirrors to direct the beam at a speed of between 300 and 2000 mm/sec (measured on the working surface) and acceleration greater than 200 g (measured on the working surface). Preferably, the beam delivery system is a completely reflective optical system, as opposed to a transmissive optical system. Preferably, the suitable laser system includes a total system accuracy of better than plus or minus 0.004 inches in any field position and for the lifetime of the equipment.

Any commercially available lasers 84 capable of obtaining the conditions described herein may be used, such as the LPM-2500 and LPM-1000 available from LasX Industries, Inc. located in White Bear Lake, Minn.

Figure 12:
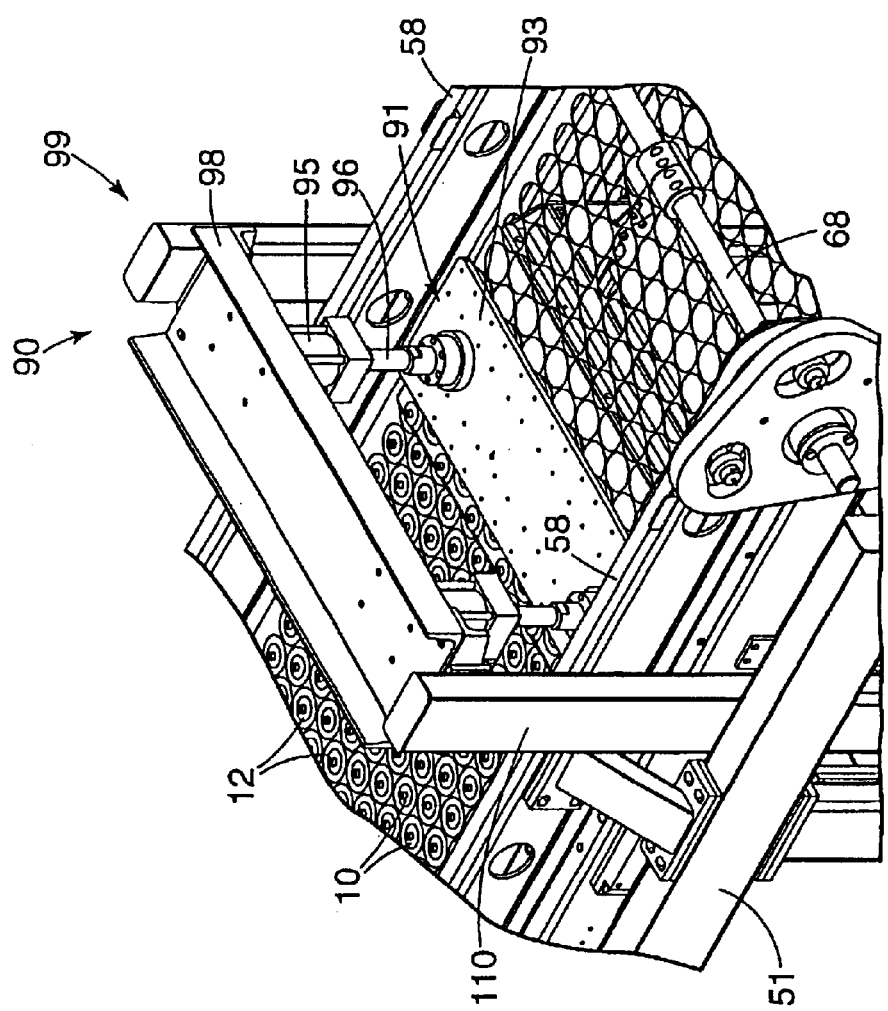
FIG. 12 is an isometric view of the separation station of the apparatus of FIG. 5.

After the surface treating articles 12 are partially cut, the web advances to the separation station 90 of the apparatus 50 illustrated in FIG. 12. The separation apparatus 99 is mounted to stand 110. The separation apparatus 99 includes an upper ram assembly 91. The upper ram assembly, which is positioned above the moving web 30, moves vertically to mechanically remove the partially cut surface treating articles 10 for the web 30. After the surface treating articles 10 are mechanically removed from the web, they fall into bin 86 (not illustrated).

Figure 13:
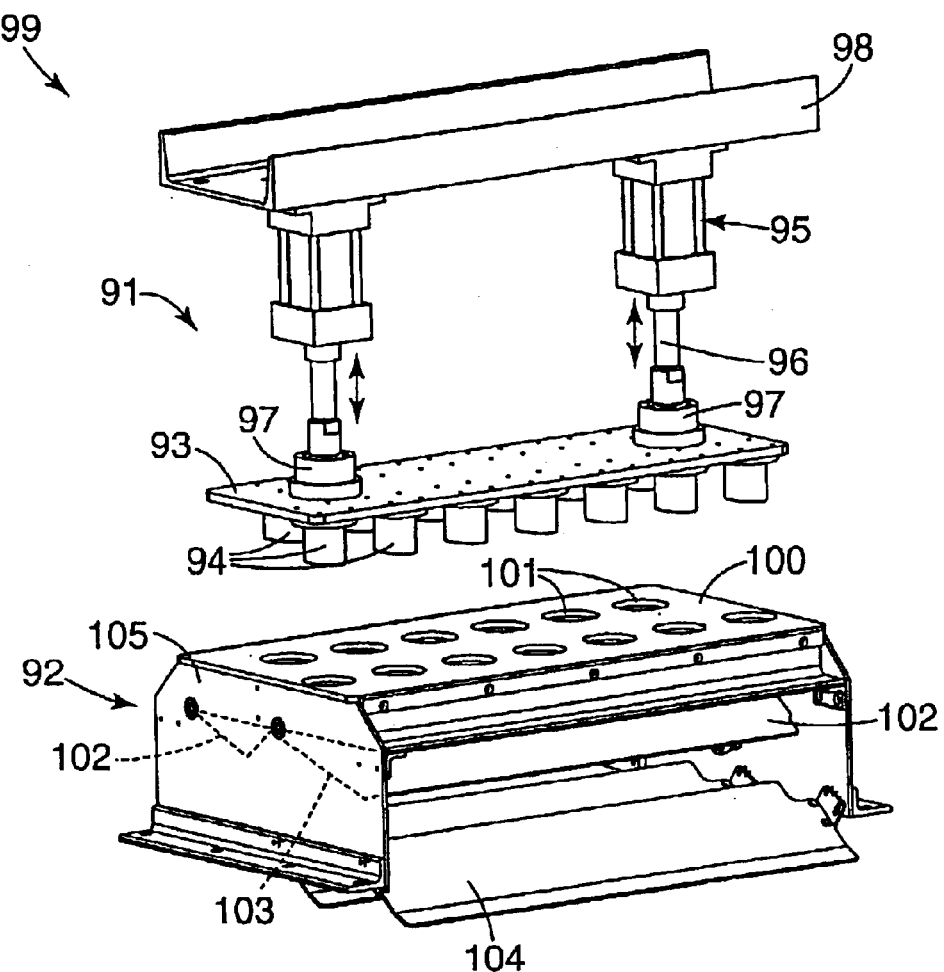
FIG. 13 is an exploded view of the separation station of FIG. 12.

FIG. 13 illustrates an exploded view of the separation apparatus 99, which is convenient for discussing the different components of the separation apparatus 99. The separation apparatus 99 includes an upper ram assembly 91 and a web back-up assembly 92. The upper ram assembly 91 includes a stationary bracket 98, which is mounted to stand 110 (see FIG. 12), and ram plate 93. Drive mechanism 95 is supported by stationary bracket 98. In a preferred embodiment, the drive mechanism 95 is an air cylinder. Shafts 96 extend from the drive mechanisms 95. Flange couplings 97 attach the shafts 96 to the ram plate 93. The drive mechanism 95 and shafts 96 move the ram plate 93 vertically. Extending from the bottom of the ram plate 93 opposite the couplings 97 are cylinders 94. The arrangement of cylinder 94 on ram plate 93 corresponds to the arrays of partially cut surface treating articles 120, 122. Preferably, the cylinders 94 are hollow and sized to match the perimeter of the partially cut surface treating articles 10. The upper ram assembly 91 is illustrated in the extended position, as if to mechanically separate the partially cut surface treating articles 10 out of the web. In this position, cylinders 94 extend through the web 30 and into holes 101 in plate 100. However, in this exploded view the upper ram assembly 91 and back up assembly 92 have been separated for illustrative purposes.

Web back-up assembly 92 is located below the upper ram assembly 91 and below the moving web 30. Web back-up assembly 92 includes plate 100 having a plurality of holes 101 sized to receive the cylinders 94 of the upper ram assembly 91. Web back-up assembly 92 includes a frame 105, which supports plate 100. Mounted inside frame 105 just below plate 100 are two back up plates 102. The two back up plates pivot about pivots 103. Two transfer chutes 104 are mounted below the two back up plates 102 inside frame 105. The transfer chutes 104 are fixed within the frame 105 and do not move. When the upper ram assembly 91 pushes down onto the web to mechanically separate the partially cut surface treating articles 10 from the web 30, the back up plates 102 are pivoted up to contact the cylinders 94 as they move through holes 101 in plate 100. After the partially cut surface treating articles 10 are mechanically separated from the web 30, they fall onto the plate 102. Next, the back up plates 102 pivot about pivots 103 into the down position, as illustrated in FIG. 13. The surface treating articles 10 then slide down onto the transfer chutes 104 and are directed into bin 86 (See FIG. 4.)

After the surface treating articles 10 are removed from the web 30, the web 30 proceeds from the separation station 90 of the apparatus 30 to the wind assembly 88, which was illustrated in FIG. 4. Wind assembly 88 includes the surface treating web roll 89. The remaining web 30 is wound around surface treating web roll 89.

Preferably, the stations 52, 60, 70, 80, 90, and 88 of apparatus 50 are coordinated such that the web 30 stops and each station does its step simultaneously at different portions of the web. However, stations 52, 60, 70, 80, 90, and 88 may be each independent or could be combined in a variety of sequences.

Although the cutting means illustrated for apparatus 50 is a laser, other cutting means may be used instead. For instance, suitable cutting means includes die cutting, water jet cutting, or ultrasonic cutting. As mentioned above, the fasteners 12 may be attached to the web 30 by methods other than spin welding.

Although it is preferable to use machine vision in combination with the laser to perform the inventive method, other combinations are within the invention, such as combining machine vision with the other suitable cutting means mentioned above or combining other sensing means with laser cutting.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A surface treating article, comprising:
   a) a surface treating member, and
   b) a fastener on said surface treating member including a drive member, wherein said drive member includes a distal end, wherein said distal end includes a fiducial, wherein said fiducial includes a planar first reflective surface, a non-reflective surface, and a planar second reflective surface, wherein the second reflective surface occupies a different plane than the first reflective surface, and wherein the non-reflective surface is at an angle relative to the first reflective surface and the second reflective surface.

2. The surface treating article of claim 1, wherein said first reflective surface and said second reflective surface are parallel.

3. The surface treating article of claim 1, wherein the surface treating member comprises an abrasive member, and wherein said abrasive member includes a working surface and a back surface opposite the working surface.

4. The surface treating article of claim 3, wherein the working surface comprises a coated abrasive.

5. The surface treating article of claim 3, wherein the working surface comprises a non-woven surface.

* * * * *

UNITED STATES PATENT AND TRADEMARK OFFICE
CERTIFICATE OF CORRECTION

PATENT NO.   : 6,817,935 B2
DATED        : November 16, 2004
INVENTOR(S)  : Bates, Michael S.

It is certified that error appears in the above-identified patent and that said Letters Patent is hereby corrected as shown below:

Column 4,
Line 8, delete "In-yet" and insert -- in yet --.

Column 7,
Line 21, delete "backup" and insert -- back-up --.
Line 35, after "Perferably" insert -- , --.

Column 9,
Line 1, after "fasteners" insert -- 12 --.

Column 17,
Line 8, after "member" delete "," and insert -- ; --.
Line 13, delete "non-refleclive" and insert -- non-relective --.

Signed and Sealed this

Seventeenth Day of May, 2005

JON W. DUDAS
*Director of the United States Patent and Trademark Office*